United States Patent
Lumelsky et al.

(10) Patent No.: US 6,377,996 B1
(45) Date of Patent: Apr. 23, 2002

(54) SYSTEM FOR SEAMLESS STREAMING OF DATA STORED ON A NETWORK OF DISTRIBUTED PRIMARY AND TARGET SERVERS USING SEGMENTATION INFORMATION EXCHANGED AMONG ALL SERVERS DURING STREAMING

(75) Inventors: Leon L. Lumelsky, Stamford, CT (US); Nelson R. Manohar, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/252,274

(22) Filed: Feb. 18, 1999

(51) Int. Cl.[7] .............................................. G06F 15/16
(52) U.S. Cl. ...................... 709/231; 709/230; 709/232; 709/203; 709/217; 709/226
(58) Field of Search ................................ 709/203, 217, 709/226, 230, 231, 232; 707/104; 375/240

(56) References Cited

U.S. PATENT DOCUMENTS

| | | | |
|---|---|---|---|
| 5,630,067 A | | 5/1997 | Kindell et al. |
| 5,682,597 A | | 10/1997 | Ganek et al. |
| 5,737,747 A | | 4/1998 | Vishlitzky et al. |
| 5,765,164 A | * | 6/1998 | Prasad et al. ............... 707/104 |
| 6,115,740 A | * | 9/2000 | Mizutani .................... 709/217 |
| 6,137,834 A | * | 10/2000 | Wine et al. ................. 375/240 |
| 6,195,680 B1 | * | 2/2001 | Goldszmidt et al. ........ 709/203 |
| 6,230,200 B1 | * | 5/2001 | Forecast et al. ............ 709/226 |
| 6,246,876 B1 | * | 6/2001 | Hontzeas .................... 455/436 |

OTHER PUBLICATIONS

"Buffering Techniques for Delivery of Compressed Video in Video–on–Demand Systems", by Wu–chi Feng, Kluwer Academic Publishers, pp. 79–82.

"Bit–Oriented Link Control", by Williams Stallings, Ph.D., Data and Computer Communications, Third Edition, pp. 171–181.

* cited by examiner

Primary Examiner—Zarni Maung
Assistant Examiner—Nabil El-Hady
(74) Attorney, Agent, or Firm—Scully, Scott, Murphy & Presser; Douglas W. Cameron, Esq.

(57) ABSTRACT

The present invention switches a source of a streaming session between a primary server and its client, from the primary server to another server at arbitrary points during the progress of the streaming session. The switching of the source is accomplished through the use of a virtual socket capable of simultaneously phasing in a new streaming connection while phasing out an old streaming connection during a streaming session that preserves the temporal progress of the session. The virtual socket acts as a client-based intermediary between the client and one or more streaming servers, thus enabling a client application to establish a streaming connection with respect to content and not to the end-party, i.e., server.

21 Claims, 13 Drawing Sheets

SYSTEM FOR SEAMLESS STREAMING OF DATA STORED ON A NETWORK OF DISTRIBUTED PRIMARY AND TARGET SERVERS USING SEGMENTATION INFORMATION EXCHANGED AMONG ALL SERVERS DURING STREAMING

BACKGROUND OF THE INVENTION

1. Field of the Invention

The present invention relates to time-constrained data streaming transmission systems and methods. More specifically it relates to techniques providing seamless switching of multimedia streams.

2. Description of Prior Art

The task of providing interactive distributed multimedia services using large and powerful distributive video servers becomes very important with proliferation of the new generation Internet, e.g., Internet2. The Internet2 project addresses creation of a leading edge network capability for the national research community and development of a new generation of applications that fully exploit the capabilities of broadband networks. Very high bandwidth and bandwidth reservation will allow materials such as continuous digital video and audio to move from research use to much broader use that will include images, audio, and video in ways currently not possible.

Internet2 applications will be built using an emerging set of middleware and development tools that support these advanced applications. Among the most critical tasks is guaranteed availability, user-centric reservation and highly interactive control of widely distributed large video servers, such as video servers, mainframes, super computers, etc.

Current approach of delivery streams with large bandwidth relies on pre-scheduling of resources. It works well with mainframes using operating systems like MVS, where multiple tasks run preferably in batch mode, or specialized Video on Demand (VoD) servers, with a predetermined start of segments, separated with relatively long and predefined time intervals.

In such approaches, due to the batch scheduling at the primary server, large queuing delays may be experienced. All the while, the client remains idle, waiting for a response to its request from the primary server. This situation arises not only during the startup of a media session, but at practically every request for change in the data flow, e.g., fast forward, stop, continue, etc. Also, the delay time is not easily predictable and in some cases, is random even for the same type of requests. The presence of arbitrarily large delay during streaming represents a nuisance to clients and, this is one of the major reasons why mainframe-based video servers are not generally used as streaming servers on the Internet.

Video servers using OS2, Windows NT or UNIX operating systems, are typically less powerful, and may not provide as many large bandwidth streams as VoD type servers. Multitasking, multithreading and preemptive operating system features of those servers, allow necessary allocation of available resources and their availability at very short delay between the request and starting point of streaming data. As a result, data streaming applications may utilize servers interactively, starting the streaming process at arbitrary point at arbitrary location in the data stream, and receiving a practically immediate response.

There are attempts to modify VoD servers to make response time faster. One method is to provide larger number of video streams, so the interval between streams is negligible, e.g., a few seconds. This is quite an expensive approach, requiring either very powerful servers, or using a cluster of servers. One such method is demonstrated by a U.S. Pat. No. 5,737,747, which is based on using multiple video servers, linked to a cached disk storage subsystem. The disk storage subsystem is responsible for a pre-fetch and buffering of the data. However, this solution requires a close proximity of video servers, preventing their geographical distribution on the network.

U.S. Pat. No. 5,630,067 demonstrates another approach that exploits peer-to-peer architecture where each server holds a segment of the information. This approach is well suited to retrieving independent segments of information, but presents a problem when synchronizing of segments stored on different servers.

Still another mechanism is described in the U.S. Pat. No. 5,682,597 that employs an auxiliary server to store an initial portion of data satisfying data flow within the time interval between two adjacent VoD streams. The auxiliary server starts a data stream in response to VoD client request, and then the system switches the data stream to a main VoD server, where video streams are pre-scheduled in a staggered manner. As a result, the initial client request is satisfied practically immediately without waiting for the start of a new VoD stream. However, this approach eliminates only initial latency, and does not allow interactive control of the stream flow, such as start, stop, and browsing.

A primary server, such as a server capable of simultaneously streaming a large number of streams. A client explicitly connects to a primary server via a socket connection through which it places a request for the streaming of multimedia content or a streaming request. The primary server then decides whether it is capable and willing to serve the streaming request by performing tasks such as admission control, setting up resources, and scheduling the request. Because resources are limited, not all streaming requests may be accepted by a primary server.

The process of deciding whether or not a streaming request may be accepted by a particular primary server involves tasks of arbitrary and variable overheads, such as queuing the incoming request, determining its admissibility, and determining its schedulability. The processing of a successful request results in the establishment of a streaming connection from the primary server to the client.

The mainframes and super computers may be used as primary servers, however, the response of a primary server to a streaming request in any such system would experience arbitrarily large delay. Meanwhile, the client that placed the streaming request remains idle. When this situation arises before the startup of a streaming session, such delay does not represent a problem. During startup time the client has yet to acquire an expectation about the quality of service (QoS) over its streaming session). However, when this situation arises during a streaming session, such delay would now represent a nuisance as the client has by now acquired a QoS expectation over its streaming session. This nuisance would manifest itself at best as a disruption on the progress of the streaming session. For this reason, primary servers do not offload clients, as the presence of arbitrarily large delay is generally considered undesirable by clients. For similar reasons, client interactivity during a streaming session is often disabled or penalized.

Additionally, there is a need for migrating a streaming client from one server onto another server. It is desirable to seamlessly switch from one content at one server to another content at another server which may not be stored on the first server for any number of reasons. Dynamic reallocation of clients during exceptions provides better fault tolerance, e.g., a video server is scheduled to go down and another video server is known to be available. Similarly, the reallocation of some streams from one video server to another may be desirable to balance the overall system load.

Therefore, what is needed to increase overall reliability and availability of service is an adaptive mechanism simple enough for effective use in Web browsing systems, permitting a streaming client to be switched across various servers without losing the temporal progress and continuity of an ongoing session. Moreover, it would be desirable to provide a data streaming mechanism that requires no user intervention and that allows the migration of such streaming clients across wide area networks.

SUMMARY OF THE INVENTION

The present invention resolves the above described problems by providing a seamless switch enabling migration of a streaming client across servers. The switching of a streaming session is enabled at arbitrary points in a manner that appears seamless to the client with respect to the continuity and temporal progress of its streaming session.

The present invention makes it possible to switch a client across servers practically regardless of admision overhead. This is accomplished via the use of intermediary servers, referred to as auxiliary servers, and a client-based virtual socket as intermediary. This switch aspect of the present invention, hereinafter referred to as "hand-off signaling," allows a primary server to offload any of its current clients onto another server, referred to as "the target server."

Furthermore, the virtual socket is capable of phasing-in a new streaming connection while simultaneously phasing-out an old streaming connection, thereby preserving the temporal progress of the session. The virtual socket acts as a client-based intermediary between the client and one or more streaming servers, thus enabling a client application to establish a streaming connection with respect to content and not to end-party, i.e., server.

To do so, the client is augmented with communications software to allow it to transparently connect and reconnect between servers, setup buffering and signaling with each server without explicit application interaction. It will be understood by those skilled in the art that the present invention allows such clients to establish content-based connectivity as opposed to server-based connectivity.

Thus the present invention is a system that allows the migration of a streaming session from a primary server to a target server to be seamless via intermediary of an auxiliary server. Although in the preferred embodiment, the auxiliary server incurs smaller overheads when compared to those of a primary server, it will be understood by those skilled in the art that the properties of the method and system are independent of the ratio between overheads incurred on primary vs. auxiliary servers.

The auxiliary server provides important enhancements to streaming architectures not yet available today:

1. the auxiliary server provides a highly available streaming capability that may be used to assist a primary server such as a mainframe or video-on-demand server by offloading, possibly temporarily, a client from the primary server onto the auxiliary server and creating a window of increased resource availability at the primary server;
2. the auxiliary server creates a resource monitoring point with respect to the performance of multiple primary servers and their migration patterns so as to provide parameters on where, when, and how to migrate a client across primary servers and/or auxiliary servers;
3. the auxiliary server provides an insertion point that may be used for dynamic insertion of content fillers such as advertisements and previews during the migration of a client that may be used, for example, to enable an illusion of continuity over the streaming session with any such client; and
4. the auxiliary server provides a mechanism to migrate a client across multiple primary servers having unknown resource availability.

It is an object of the present invention to implement an auxiliary server that provides a highly available streaming capability used to assist a primary server, such as a mainframe or video-on-demand server, to temporarily offload a client currently engaged in a streaming session with the primary server onto the auxiliary server so as to create a window of increased resource availability at the primary server.

It is another object of this invention to use the auxiliary server to provide an insertion point that may be used for dynamic insertion of content fillers such as advertisements and previews during a switch so as to provide an illusion of temporal progress and continuity to a streaming client.

It is another object of this invention to use the auxiliary server to create a resource monitoring point with respect to the performance of primary servers so as to provide parameters on location, time and manner (where, when, and how) for client migration across primary and/or auxiliary servers.

It is yet another object of this invention to use the auxiliary server to provide a mechanism for client migration across multiple primary servers having unknown resource availability.

It is yet another object of this invention to use a signaling protocol between the servers and the client to ensure that the switch takes place only when it is possible to accomplish switching seamlessly, through the use of a redundant buffering scheme at the client.

The foregoing, together with other features and advantages of the present invention, will become more apparent when referring to the following specification, claims and accompanying drawings.

BRIEF DESCRIPTION OF DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE INVENTION

Figure 1:
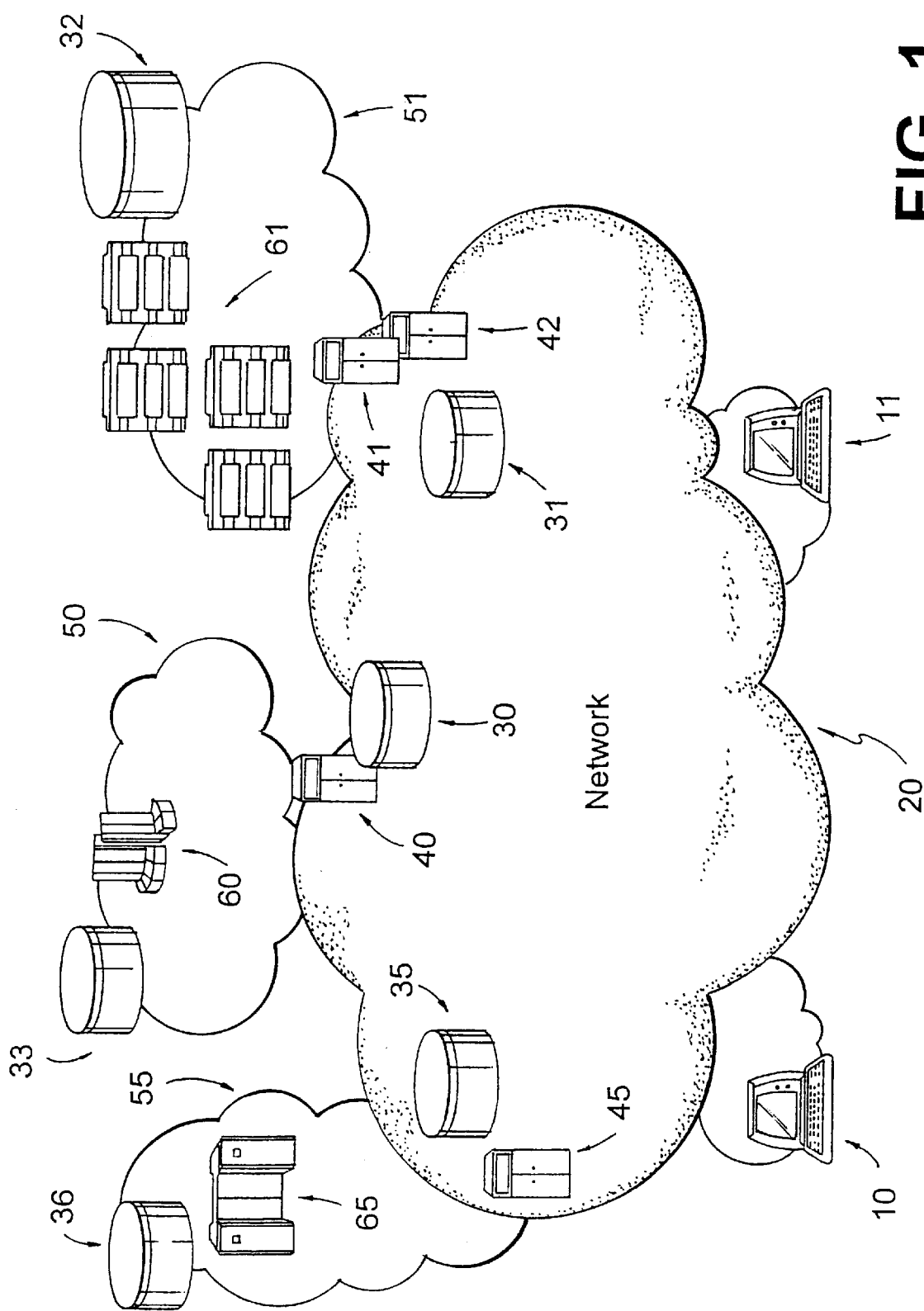
FIG. 1 is a diagram of a computer network environment, consisting of layers of mainframes, video on demand servers, network storage, auxiliary server, and clients.

FIG. 1 shows a networked computer environment consisting of cluster 55 having a mainframe 65 and a database 36, cluster 50 having a supercomputer 60 and a database 33, cluster 51 having video on demand servers 61 and a database 32, auxiliary servers 40, 41, 42, 45 having databases 30, 31, 35, and clients 10 and 11, all connected by a network 20.

Typically, a request for a stream is placed by a client 10, 11 and handled by a high performance server such as a video on demand server 61. The server 61 may or may not satisfy a streaming request with a streaming connection. A streaming connection enables the streaming of multimedia content from a server to a client.

Because of limited resources, such as bandwidth, processing power, and memory, servers have limitations with respect to the maximum number of simultaneous streaming connections. Several strategies may be used to increase the availability of media content through streaming connections. For example, if a server performance is a limiting factor, clusters of video servers 51 may be used. Similarly, when streaming requests refer to the same media content, specialized video servers, referred to as Near Video on Demand (NVoD), may be used to further increase performance by staging, i.e., delaying, streaming requests for identical media content to common starting points and thus effectively reducing the processing needed to handle all these clients to that of a single streaming. To provide even larger numbers of different streaming requests, mainframes 65, such as IBM S390, and super-computers 60, such as IBM SP/2, may be used. To increase I/O access performance to media content, content databases 36, 33, 32 may be replicated and directly connected to these servers and mainframes.

Figure 2:
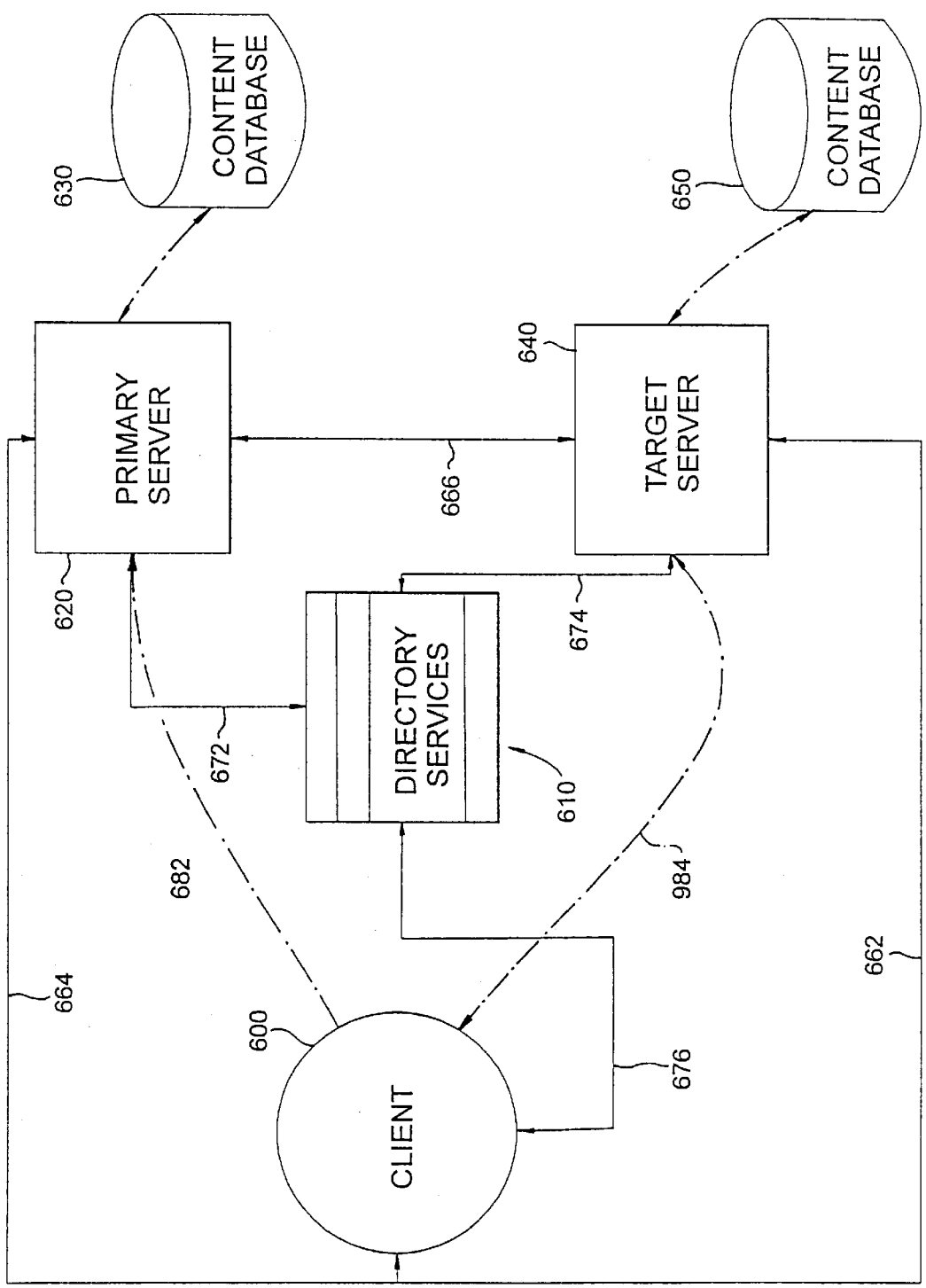
FIG. 2 is a more detailed view of the diagram of FIG. 1, with a focus on the relationships and components used to realize the preferred embodiment.

The present invention provides the ability to dynamically offload a streaming session and respectively, its streaming client from any primary server described above to any target server described above. FIG. 2 shows a more detailed view of the computer networking environment that focuses on the relationships and components used to realize the preferred embodiment. The environment of the preferred embodiment comprises of:

1. the switching parties, being the client 600, the primary server 620, and the target server 640;
2. directory services 610 providing storage and access 672, 674, 676, to common state across the switching parties;
3. replicated content databases 630, 650, providing access to the media content;
4. possibly dissimilar levels of network connectivity 682, 684, between the switching parties; and
5. signaling channels 662, 664, 666, between the switching parties.

Returning to FIG. 1, auxiliary servers 45, 40, 41, 42 are used as temporary target servers to assist in the migration of streaming sessions and their clients across primary servers. The migration of a streaming session across servers requires reconnecting and reestablishing a new streaming connection. A seamless switch is thus referred to as the migration of a client between two streaming servers during which the state of its streaming connection is preserved and synchronized. In a seamless switch, stream processing on the client-side of the application appears to remain unaffected. Furthermore, the client does not necessarily need to know which server, primary or auxiliary, is currently provisioning its content.

Figure 3:
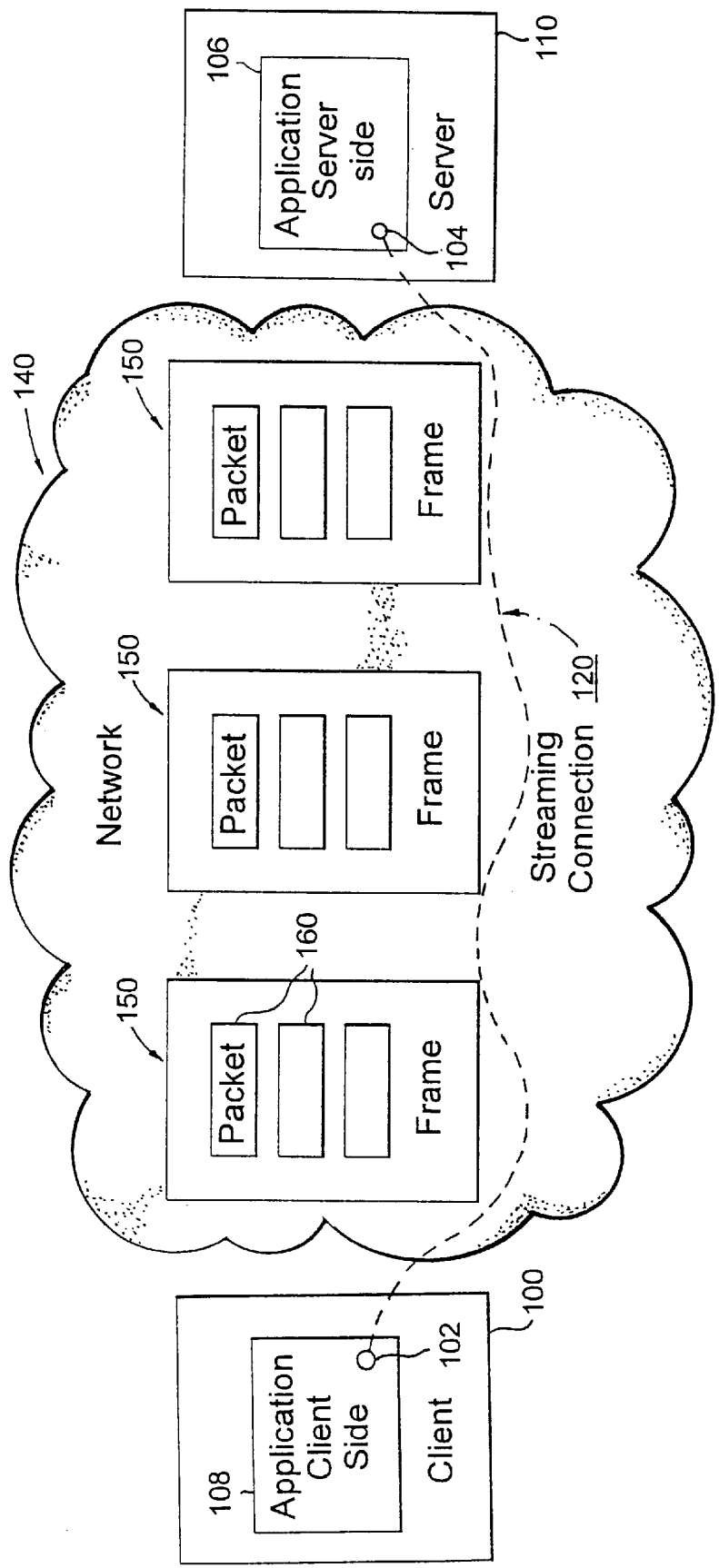
FIG. 3 is a detail diagram of a streaming client, server, and a streaming connection between them.

FIG. 3 shows in more detail a part of the above referenced computer networked environment where a streaming connection between a client 100 and a server 110 connected via a computer network 140. The streaming connection 120 represents a data pipeline or conduit between a server-side application and its client-side application. The server 110 streams multimedia content to the client 100 via a streaming connection 120. Multimedia applications are represented as having a client side 108 and a server side 106. In multimedia applications, a content stream is composed of application-level objects referred to as frames 150. To transmit over the streaming connection 120, frames are decomposed into packets 160. The data pipeline has two physical ends, referred to as sockets, one at the server-side 104 and one at the client-side 102. Packets 160 are sent by the server through the server-side socket 104 of the streaming connection and are received at the client-side socket 102 of the streaming connection by the client. The client-side of the application 108 extracts packets 160 from the client-end socket of the data pipeline. The client reassembles packets 160 back into frames 150 which are then handed out to the client-side of the application 108.

In order to maintain a full and continuous data pipeline between server and client side of an application, the presentation of data, i.e., to the client-side of the application on the client that requested the stream, is slightly delayed so as to allow for the build up of these packets or buffers. Buffering of a stream at a client is used to smooth out transmission and processing delays.

Because the use of these buffers smooth the inter-arrival distribution of the data arriving through the streaming connection, as perceived by the client, this technique is referred to as smoothing. Although buffering of a stream is desirable, however, too much buffering introduces overhead as well as interfere with the level of interactivity provided to the client application. Ways to optimally smooth a stream between a given server and a client is described in the reference "Buffering Techniques for Delivery of Compressed Video in Video-on-Demand Systems," by Wu-chi Feng, Kluwer Academic Publishers, ISBN 0-7923-9998-6, 1997.

Figure 4:
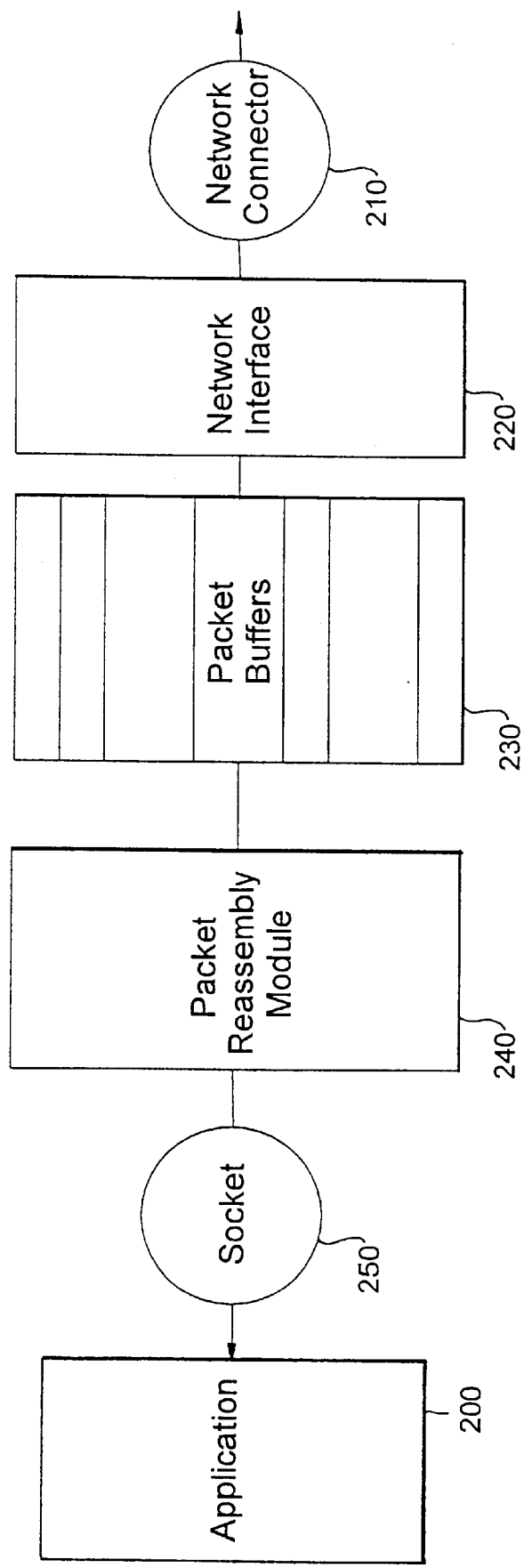
FIG. 4 is a diagram of the decoding components of a streaming client.

FIG. 4 shows a typical client side of a streaming connection found in streaming clients. A network connector 210 provides the physical endpoint to the streaming connection 120 (FIG. 3) at the client 100 (FIG. 3). A network interface unit 220 provides transmission functions such as error correction and retransmission of packets. Successfully received packets are then stored in memory referred to as packet buffers 230.

Packets are ordered and reassembled by a networking software packet re-assembly module 240, into the original byte stream. The client-side of the streaming application 200 interfaces to this component through a logical abstraction referred to as a socket 250. The socket provides a byte stream abstraction to the network. Typical streaming connections rely on a particular type of socket refer to as a Transmission Control Protocol (TCP) socket which enforces reliable first in/first out pipelining of data through the network. The socket provides a logical interface to physical transmission of data between precisely two points in the network.

Figure 5:
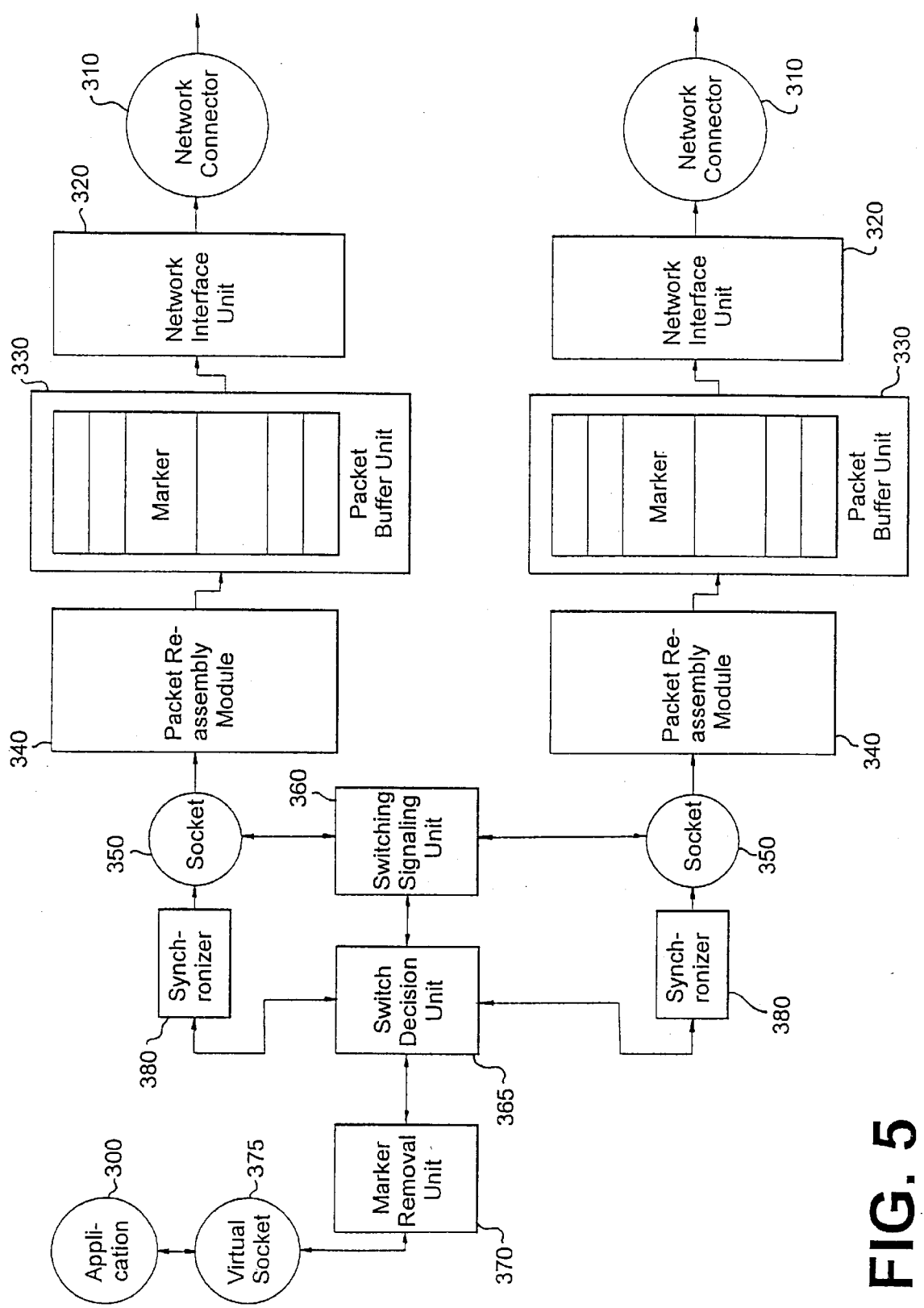
FIG. 5 is a diagram of the decoding components of a switching-capable streaming client.

FIG. 5 depicts the components of a client in the present invention for a client that is now capable of performing a seamless switch at any time before or during a streaming session. The streaming application 300 in the client now interfaces to a virtual socket 375. The virtual socket 375 appears just as a socket to the application, i.e., a logical interface to a byte stream to/from the network, while it hides the complexities of redundant stream processing to its application.

Redundant components are introduced as follows. Two data pipelines are setup consisting of two network connectors 310, two network interfaces 320, two packet buffers 330, two packet re-assembly software modules 340, and two sockets 350 referred to as primary and secondary respectively.

It should be obvious to a skilled artisan that with the advent of quality of service networks it is possible to setup two simultaneous and independent streaming connections with guaranteed quality of service levels as long as enough processing resources are made available on the client. In the present invention a secondary socket is used to phase in a stream being provided in the primary socket. Unlike the use of catch-up buffers, the present invention allows such switch to occur at any point in the streaming session. When both sockets are in use, a synchronizer unit 380 searches for and locates the current segmentation markers in primary and secondary streams and feeds this marker segmentation information to a switch decision unit 365. This allows the present invention to preserve the temporal correspondence between these redundant streaming connections as the streams may be synchronized in terms of these segmentation markers.

The switching decision unit 365 determines whether both redundant streams have sufficient overlap before switching from the primary streaming connection to the secondary streaming connection. In the present invention, this decision is made in terms of segmentation markers. When the switching decision unit 365 determines that a common marker is present in both streams, it concludes that both streams are overlapping. The switching decision unit 365 then determines whether this overlap is sufficient to enable a seamless switch from the primary socket into the secondary socket. To do so, enough data must be present in the buffers of the secondary streaming connection so as to allow its smoothing.

Clearly, the amount of time needed to achieve this condition is variable as it depends on the prevalent network conditions that exist at the time in that particular streaming connection. When such condition is met, the switching decision unit 365 raises an exception to the switching signaling unit 360. Otherwise, the synchronizer 380 passes the data through to the marker removal unit 370 which searches for segmentation markers and removes them from the stream before being presented to the virtual socket 375. As a result, the virtual socket 375 presents the original byte stream to the streaming application 300. On the other hand, when the switching exception signal is raised, the switching signaling unit 360 formats and sends a message referred to as a tear down message to the server.

Segmentation markers, to be identified by the client, are overlayed over a stream at precise locations. The placement of segmentation markers within a stream is content independent. According to one aspect of the present invention, the placement of segmentation markers is based on a globally known constraint, such as every L number of bytes of original data. The network directory services 910 (FIG. 2) may be used to store, for any given stream, the criteria used to segment the stream. Clients and servers then rely on the corresponding unique stream identifier to retrieve the criteria and apply this constraint to the processing of the stream. In the preferred embodiment, this is accomplished prior to the decoding of the stream through the steps of:

a) inserting segmentation markers into a stream prior to the streaming and after the encoding;

b) exchanging information between switching parties in terms of segmentation markers during a seamless switch,; and c) identifying, locating, and removing these segmentation markers in any such stream at the client.

Figure 6:
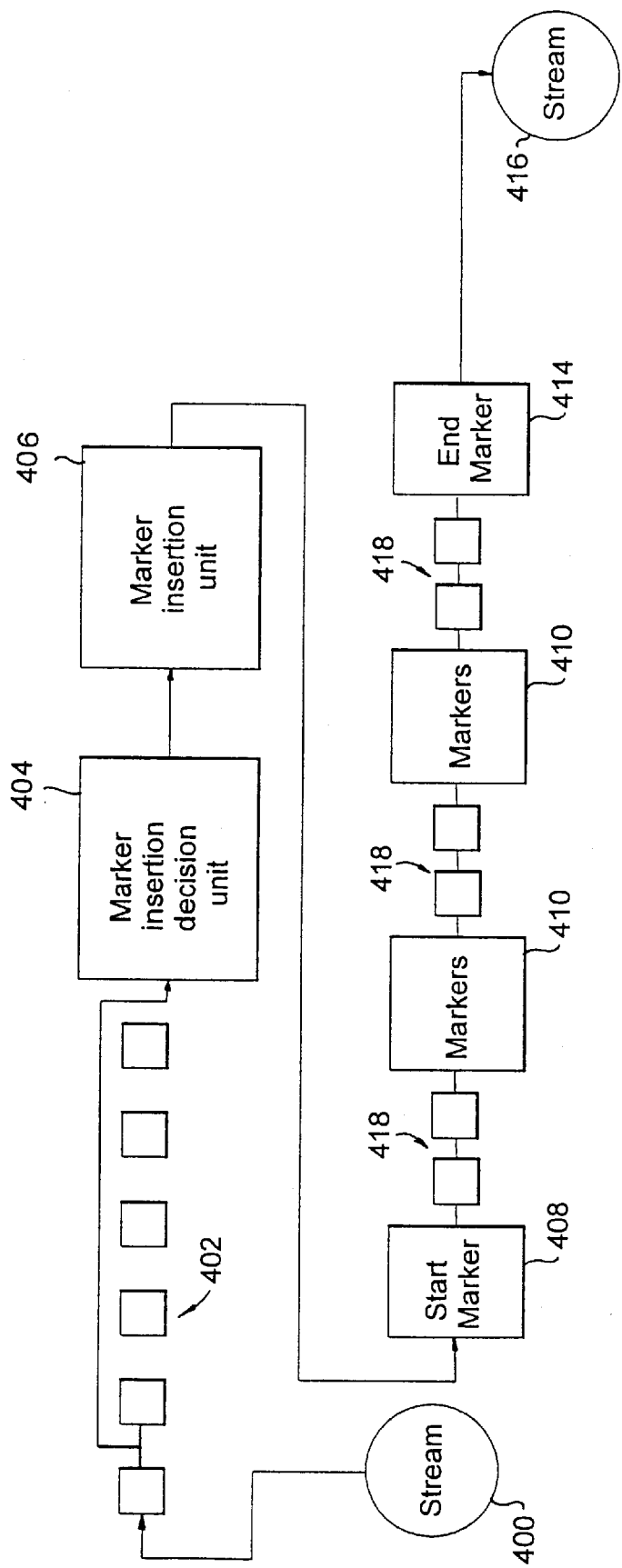
FIG. 6 is a diagram illustrating the insertion of the segmentation marker into a stream resulting in the generation of a segmented stream.

FIGS. 4 through 6 depict the usage of segmentation markers when applied over the data pipeline. The system has the property of being content independent thus allowing the present invention to process and manage proprietary streaming formats.

FIG. 6 shows the insertion of segmentation markers into the original stream 400 that is to be transmitted by a primary server. As previously stated, the original stream is composed of frames 402. Frames are processed by a marker insertion decision unit 406. The marker insertion decision unit 404 determines, based on some constraint, whether to and where to insert a segmentation marker and instructs the marker insertion unit to do so. In the preferred embodiment, this decision is based in a modulo L byte count over the original stream. The marker insertion unit 406 prepares and formats the segmentation markers 408, 410, 414 and then inserts them among the frames 418 of the original stream 416. A marked stream must have a starting and ending segmentation markers 408, 414 and zero or more intermediary segmentation markers 410.

Figure 7:
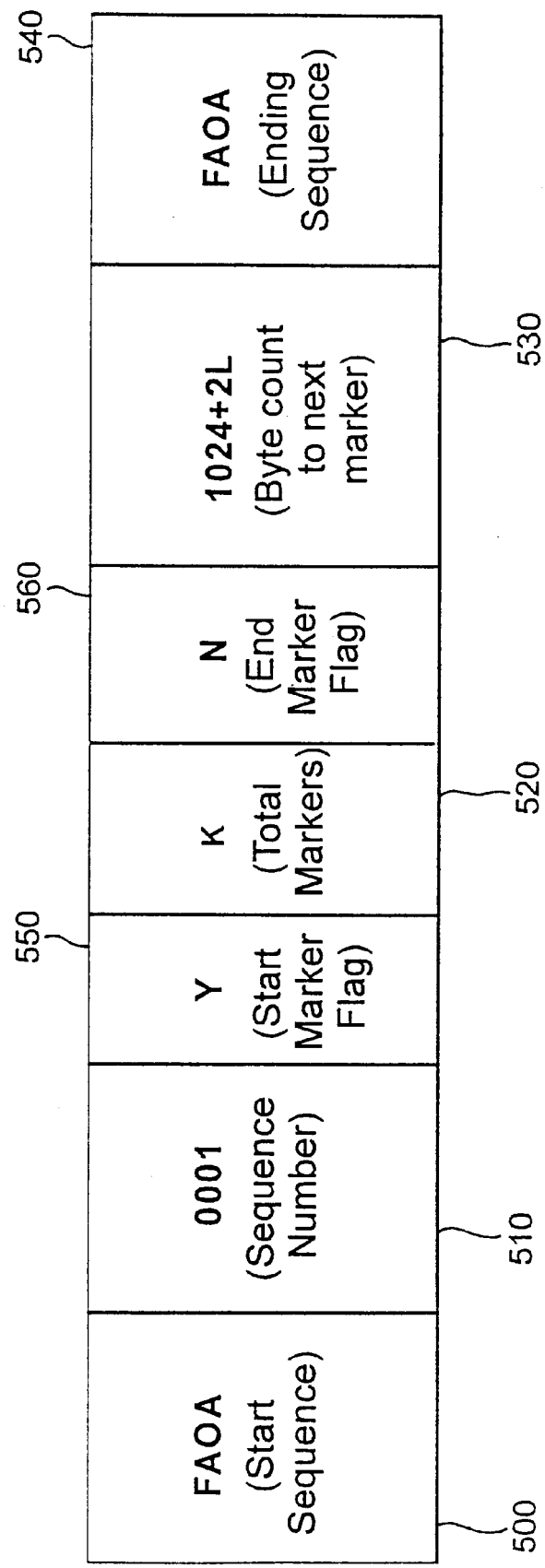
FIG. 7 is a diagram illustrating the data structure of a segmentation marker.

FIG. 7 shows a segmentation marker composed of a starting sequence 500 and an ending sequence 540. Those starting sequences allow the identification of the segmentation marker by any client. In the preferred embodiment, the ending sequence 540 is used to implement marking with a fixed number of bits by making the ending sequence 540 of the k-th segmentation marker be the starting sequence of the (k+1)th segmentation marker, and choosing the marker to be a function of the L bits between the markers. Data that describes the sequence number of the current marker 510 and the number of bytes 530 between this and the next marker is inserted between the start and ending sequences 500, 540. In the preferred embodiment, the number of bytes between markers is L except on possibly the second to last segmentation marker which may contain less than the L bytes.

Furthermore, to facilitate processing during a seamless switch, three additional fields are used: a flag to identify the starting segmentation marker 550, a flag to identify the ending segmentation marker 560, and a field to identify the total number of markers in a stream 530.

It will be understood by those skilled in the art that these fields may be used additionally to facilitate error recovery during a loss of a segmentation marker.

Figure 8:
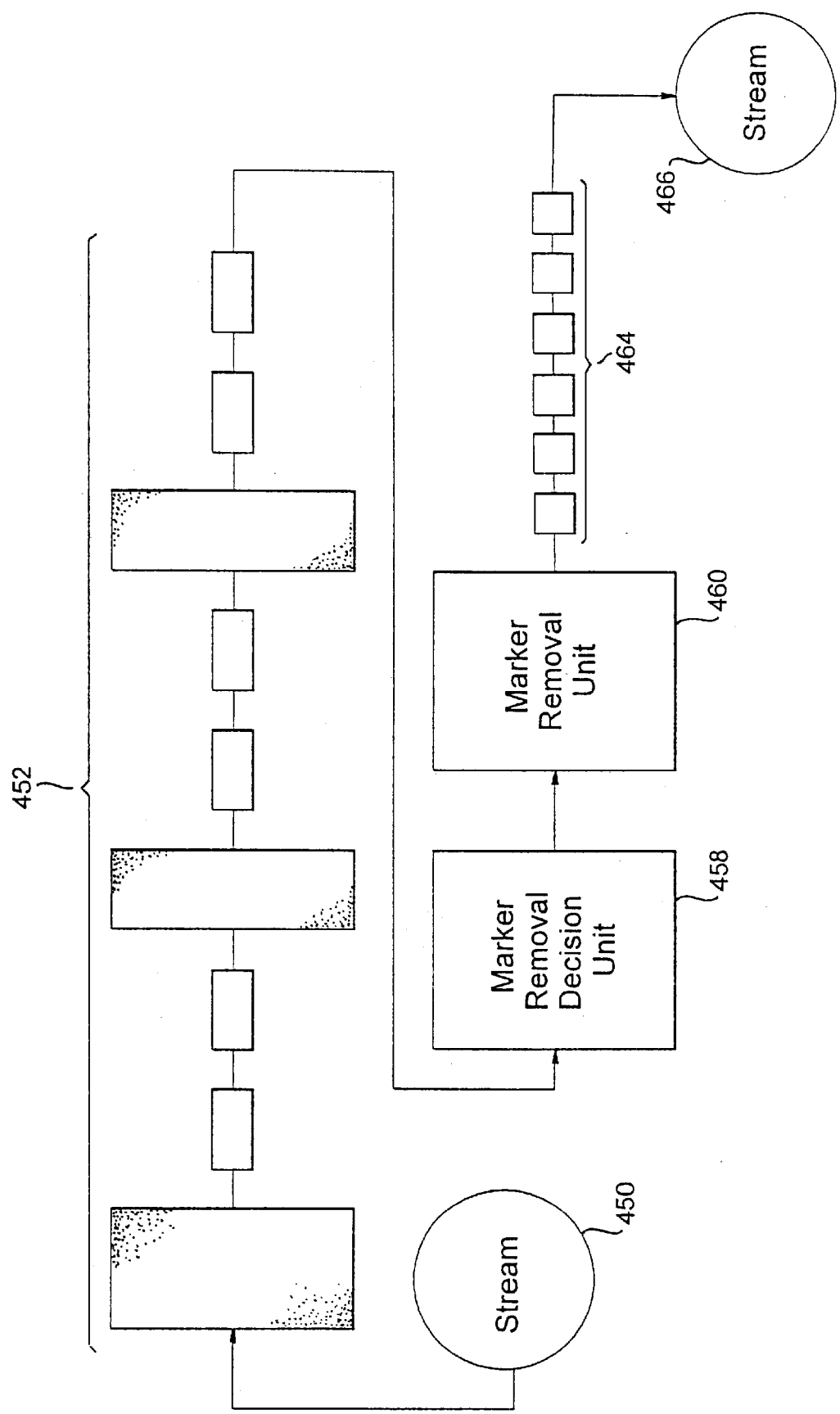
FIG. 8 is a diagram illustrating the deletion of the segmentation marker from a segmented stream resulting in the recovery of the original stream.

The removal of segmentation markers at a client from a marked stream is shown in FIG. 8. The incoming marked stream is processed by the marker removal decision unit 458, which analyzes the stream and searches for segmentation markers. Preferably, it looks for the starting segmentation marker 408 (FIG. 6) and then searches for the next segmentation marker 410, 414 (FIG. 6).

It will be understood by those skilled in the art that there exist known and efficient techniques, such as these presented in Data and Computer Communications, William Stallings, Prentice Hall; ISBN: 0024154253, to define, insert, identify, and delete a variable size marker into an arbitrary byte stream in a way analogous to bit stuffing approach implemented in HDLC protocol To simplify the marker identification problem, in the preferred embodiment the starting marker may be assumed to be a well known sequence. The sharing of this knowledge, i.e., the starting marker for a particular stream, across the various signaling parties, would be realized again through the use of a network directory service.

To identify an arbitrary segmentation marker in the middle of a streaming session, the signaling protocol needs to relay shared information to the various signaling parties. To this end, the current segmentation marker and the target segmentation marker fields are reserved in the signaling message format and intended for the relay of such shared knowledge. To facilitate parsing and identification of the segmentation marker at the client, it is important to be able to guarantee that the client to locate the starting sequence of any segmentation marker.

To this end, it is important that the target server starts its streaming to the client only from a segmentation marker and that the starting sequence of the selected segmentation marker be known to the client. For this reason, the distance from the target segmentation marker, m(k), in relation to the current segmentation marker, m(j), is set to be large enough or approximately $$T(setup)=[(k-j+1)*L]/[max(B(PS1,C),B(AS1,C))]$$

seconds, where B(PS1,C) is the required bandwidth for the streaming connection between server PS1 and client C; and B(AS1,C) is the computed bandwidth needed to buildup the streaming connection between server AS1 and client C. Therefore enough time is given to accommodate network and transmission delays associated with the exchange of shared state by the signaling protocol. It will be understood by those skilled in the art that the robustness of this approach may be increased by requiring the server initiating the migration to compute a table containing the segmentation markers into the marked stream and to then distribute this table to all signaling parties.

The marker removal decision unit, shown in FIG. 8, raises an exception to the marker removal unit 460 which then removes the identified segmentation marker from the marked stream 452. The original bytes 464 are then extracted and presented to the virtual socket. The resulting stream 466 as seen by the client-side of the application is thus identical to the original stream 400 (FIG. 6) before it was marked by the server.

The present invention enables a primary server to perform a migration of a client engaged on a streaming session onto another server via a seamless switch. The seamless switch occurs during a streaming session in such a manner that it preserves the temporal progress and continuity of its session. The seamless switch is comprised of:

a. signaling to the switching parties, when a specified constraint is met, that a client migration will take place;

b. maintaining and when necessary synchronizing multiple partially overlapping redundant buffers of a stream associated with the streaming session at the client to be migrated; and c. signaling between the switching parties, when a specified constraint is met, that the migration may safely take place.

Figure 9:
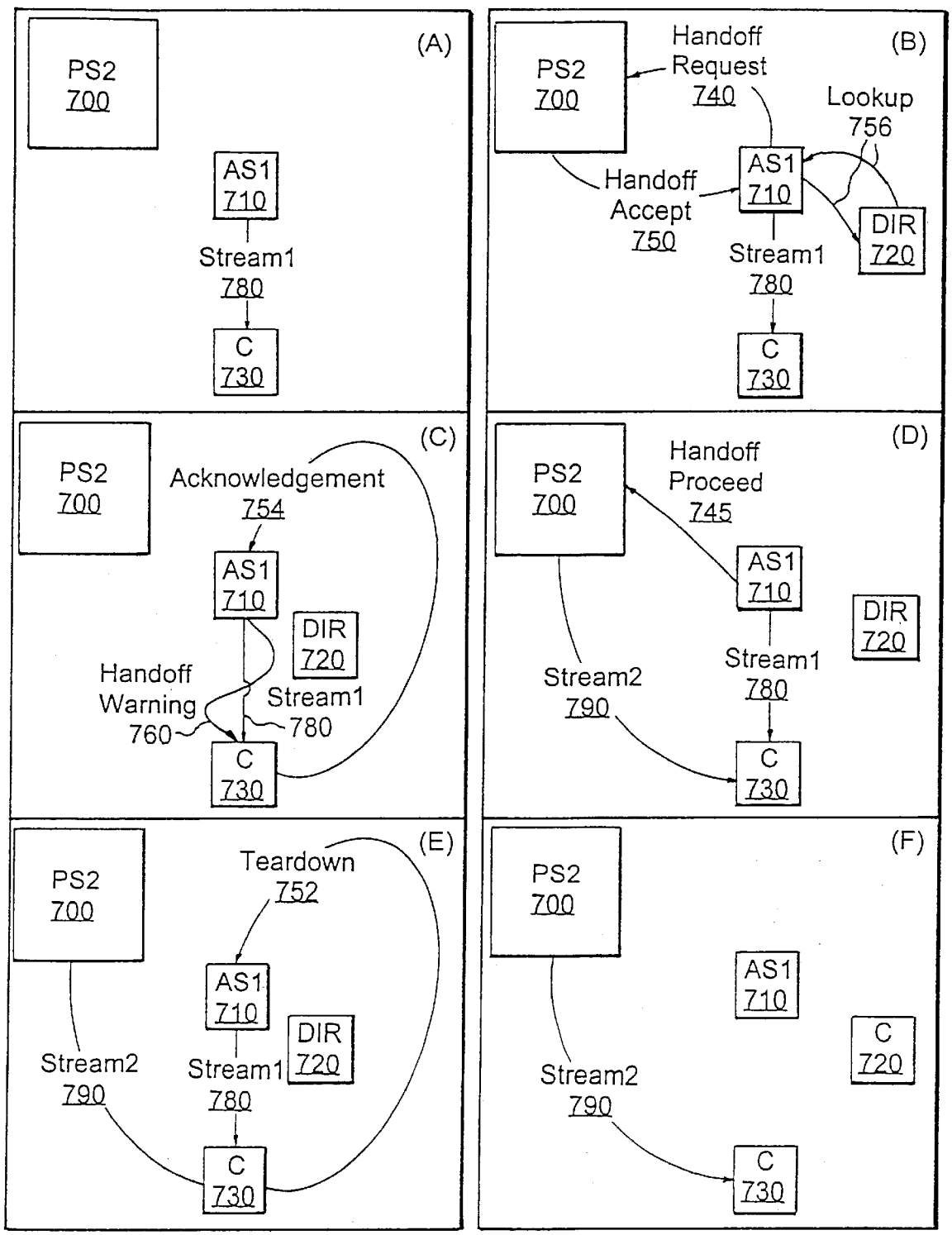
FIG. 9 is a diagram illustrating the signaling that takes place for migrating a client from a main server onto a target server.

FIG. 9(A) shows the signaling protocol for migrating a client from a server AS1 710 onto a target server PS2 700. Initially, the client 730 is engaged in a streaming session with AS1 710. That is, AS1 710 streams content through a streaming connection 780 to the client 730. At some point of time, AS1 710 determines that it wants to offload this client and decides to migrate that particular streaming session onto another server.

As shown in FIG. 9(B), AS1 710 determines a target server to which to offload the client. In the preferred embodiment, network directory services may be used to make this determination. This network directory service should be populated with servers willing to accept migrating clients from other servers.

It will be understood by those skilled in the art that this directory service may be enhanced with data such as constraints on content and service availability. For example, a target server may be enable for only a given geographic area, Internet address range, or only for certain streams such as the top ten movies. Furthermore, an explicit target server is not necessary, as the client may theoretically be hand-off across one or more auxiliary servers until a willing and capable primary server admits the migrating client. Meanwhile, the client should not perceive the effects of these migrations.

To migrate a client and its streaming session, AS1 710 signals the selected target server PS2 700 with a hand-off request message 740. The hand-off request message 740 contains the unique identifier of the hand-off request, the unique identifier of the stream, the current segmentation marker on this stream, the unique identifier of the client, the target segmentation marker, etc. These identifiers are found in all the messages of the switching protocol. The server PS2 700 applies admission control and decides whether to accept the new streaming request. For example, on a QoS network such as Internet2, PS2 700 would determine whether the stream is available at its server and whether it may allocate resources to the given client. The server PS2 700 uses the unique identifiers contained in the hand-off request message to retrieve information about the stream.

On a best effort network, it will be understood by those skilled in the art that the target server, based on the target segmentation marker associated with a request, may estimate whether given the current network conditions and resources, a streaming connection would be available, with a safe margin of error, for performing a seamless switch at the desired target segmentation marker.

If the target server is not willing or capable of accepting the migrating client, there are two ways that the target server may relay its intention to the main server. The target server may explicitly signal the main server with a denial of service for the specific hand off request or alternatively, the target server may just ignore the request causing the main server to time out. On the other hand, if PS2 700 accepts the hand-off request, it signals this to AS1 710 through the hand-off accept message 750.

Once AS1 710 receives the hand-off request message, AS1 710 proceeds to warn its client of the imminent switch. As shown in FIG. 9(C), this is done via the hand-off warning message 760. The hand-off warning message warns the client that it will switch to a new server, pointed to by a unique identifier. The hand-off warning message is necessary so as to allow the virtual socket on the client to setup its secondary streaming connection to the target server. Once the resources for the secondary streaming connection are setup, the client signals AS1 710 of its readiness via the hand-off acknowledgment message 754.

Once the main server AS1 710 receives the hand-off acknowledgment message, as shown in FIG. 9(d), AS1 710 then signals the target server PS2 700 to proceed via the hand-off proceed message 745 which triggers a flow of packets through secondary the streaming connection 790 to the client. This secondary streaming connection starts after the current segmentation marker identified in the hand-off proceed message. At this point of time in the signaling protocol, the client has two incoming streaming connections 790, 780 one from each server.

Once its switching decision unit determines that it is safe to switch between these redundant streams, as shown in FIG. 9(E), the client signaling unit sends a hand-off tear down message 752 to the main server AS1 710. The client then cleans up its initial streaming connection and renames the secondary streaming connection to be its primary. As shown in FIG. 9(F), the AS1 710 server cleans up its streaming connection to the client and updates its admission control state with the resources relayed by this connection and the completion of the client migration. It will be understood by those skilled in the art that data buffers from the primary server may be copied into the secondary server for optimization.

Figure 10:
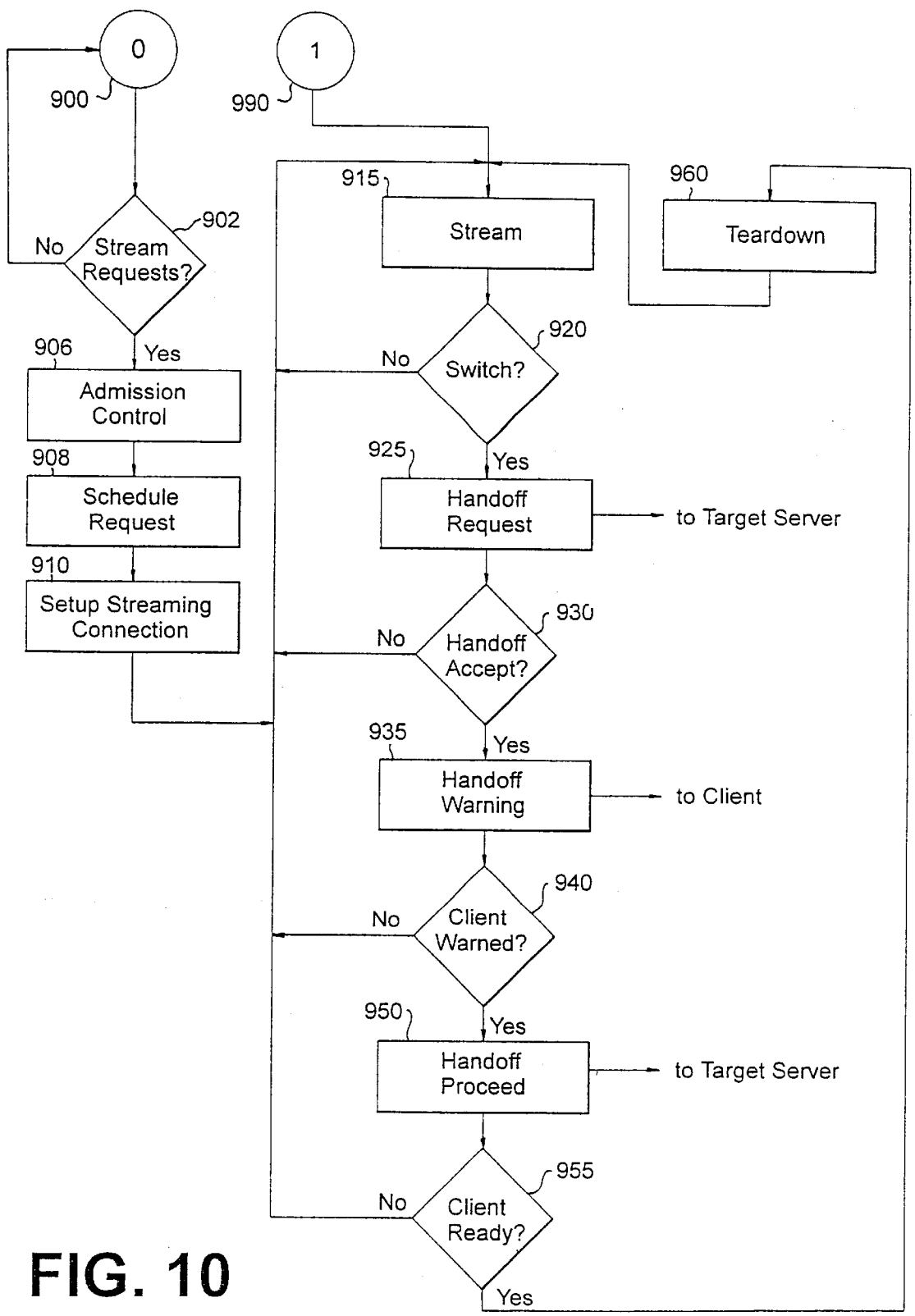
FIG. 10 is a flowchart of a main server switching out a client onto a target server.

FIG. 10 shows flow of steps of a switching-capable server. Upon receiving input at step 900, step 902 determines if the input is a streaming request from a client. If it is, at step 906 the server applies admission control. After being admitted, the request is scheduled at step 908. It will be understood by those skilled in the art that admission and scheduling delays may be arbitrary and variable and depend on the type of server, i.e., mainframe, VoD/NVoD, and auxiliary. It is an object of this invention to make these delays unobtrusive to a client.

Once the request is scheduled for service, the setup of the streaming connection is started at step 910. Once the streaming connection is setup, i.e., resources are allocated, connectivity is achieved, etc . . . , the client is then considered ready for streaming and streaming commences at step 990. Content is then streamed across the streaming connection to the client at step 915.

The present invention provides a main server with the ability to offload a streaming client to another server referred to as the target server. Thus, during the ongoing streaming, the main server may decide to offload the client. If at step 920 the decision is made not to offload/switch, then process returns to step 990.

However, if the decision to switch is made, then the main server waits for the next segmentation marker, retrieves the marker, and then signals a target server with a hand-off request message at step 925. The selection of a target server may be done in many different ways such as by finding where replicas of the content are available, finding sites with availability, choosing a target server at random, etc.

The main server waits for a reply from the target server while continuing to stream content to the client. Step 930 determines if the target server accepted the hand off request. If not, process returns to step 990. If the hand off request was accepted, at step 935 the main server then proceeds to warn the streaming client of the imminent switch to the selected target server. This allows the client to prepare its virtual socket for a secondary streaming connection.

After the streaming client sets up its resources for a secondary streaming connection from the selected target server, it acknowledges its readiness via an acknowledgment message 754 (FIG. 9(C)). At step 940, if the acknowledgment message was not received, process returns to step 990. If the main server receives the acknowledgment message at step 940, it determines that the client has been properly warned. The main server then determines and updates the current sequence marker for this stream and then, at step 950, proceeds to instruct the target server to stream content to the previously specified streaming client but at the new sequence marker via the hand-off proceed message 745 (FIG. 9(D)). The virtual socket at the client is now handling two streaming connections: one from the main server, the other from the target server. The virtual socket then aligns these two streams and determines when there is sufficient overlap.

At that point at step 955 if the client is not ready process returns to step 990, however if the client is ready, at step 960 it switches off the main server and sends a tear down message to the main server so as to release the resources associated with the original streaming connection. After which the process returns to step 990.

The streaming client has been successfully offloaded to the target server, the streaming connection has been dealt a hand-off with respect to a sequence marker to maintain temporal progress during the switch, and a virtual socket has redundantly buffered two streaming connections and waited until sufficient overlap has been found to effect a seamless, synchronized switch between two streaming connections.

Figure 11:
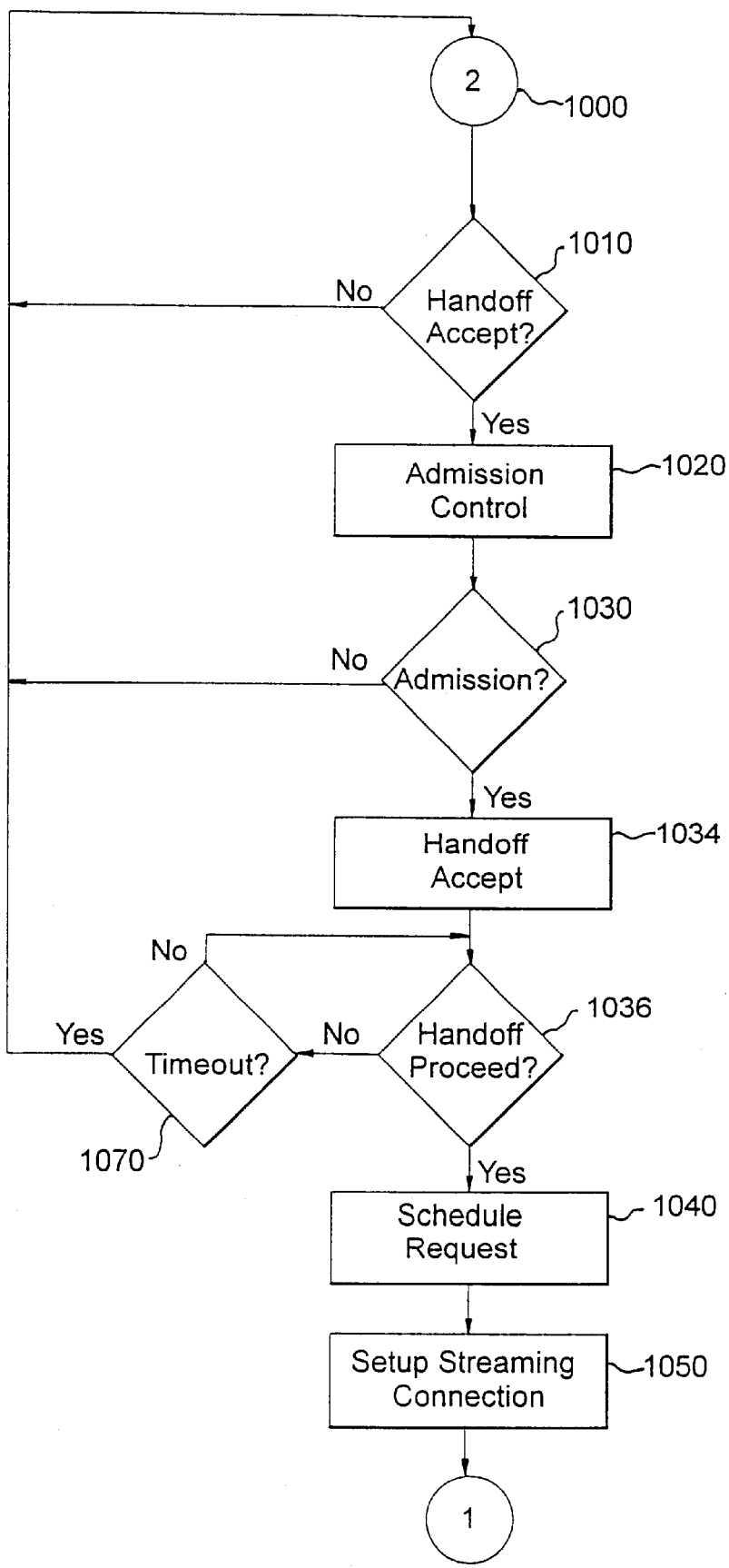
FIG. 11 is a flowchart of target server handling of a hand-off request for switching out a migrating client onto the target server.

FIG. 11 shows the processing steps of a target server migrating in a client from a main server. The target server receives signals at step 1000. At step 1010 a determination is made whether a hand-off request was received. If not, the processing returns to step 1000 to receive more signals. Whenever a hand-off request is received, the target server applies admission control at step 1020. If a request is determined not to be admitted at step 1030, then the processing returns to step 1000 to receive more signals, otherwise at step 1034, the target server sends a hand-off accept message to the main server, and waits for the receive from the main server.

A determination is made at step 1036 to determine if a hand-off proceed message received. If the hand-off proceed message was not received and a timeout was taken, the processing returns to step 1000 to receive more signals. If the hand-off proceed message was not received and a timeout was not taken the processing returns to step 1036. A reception of the hand-off proceed message signals that it is OK to setup a streaming connection to the client. A stream connection is then scheduled at step 1040, and setup is performed at step 1040 and the streaming is then initiated at step 990 (FIG. 10). However, in this case, the target server becomes a main server.

Figure 12:
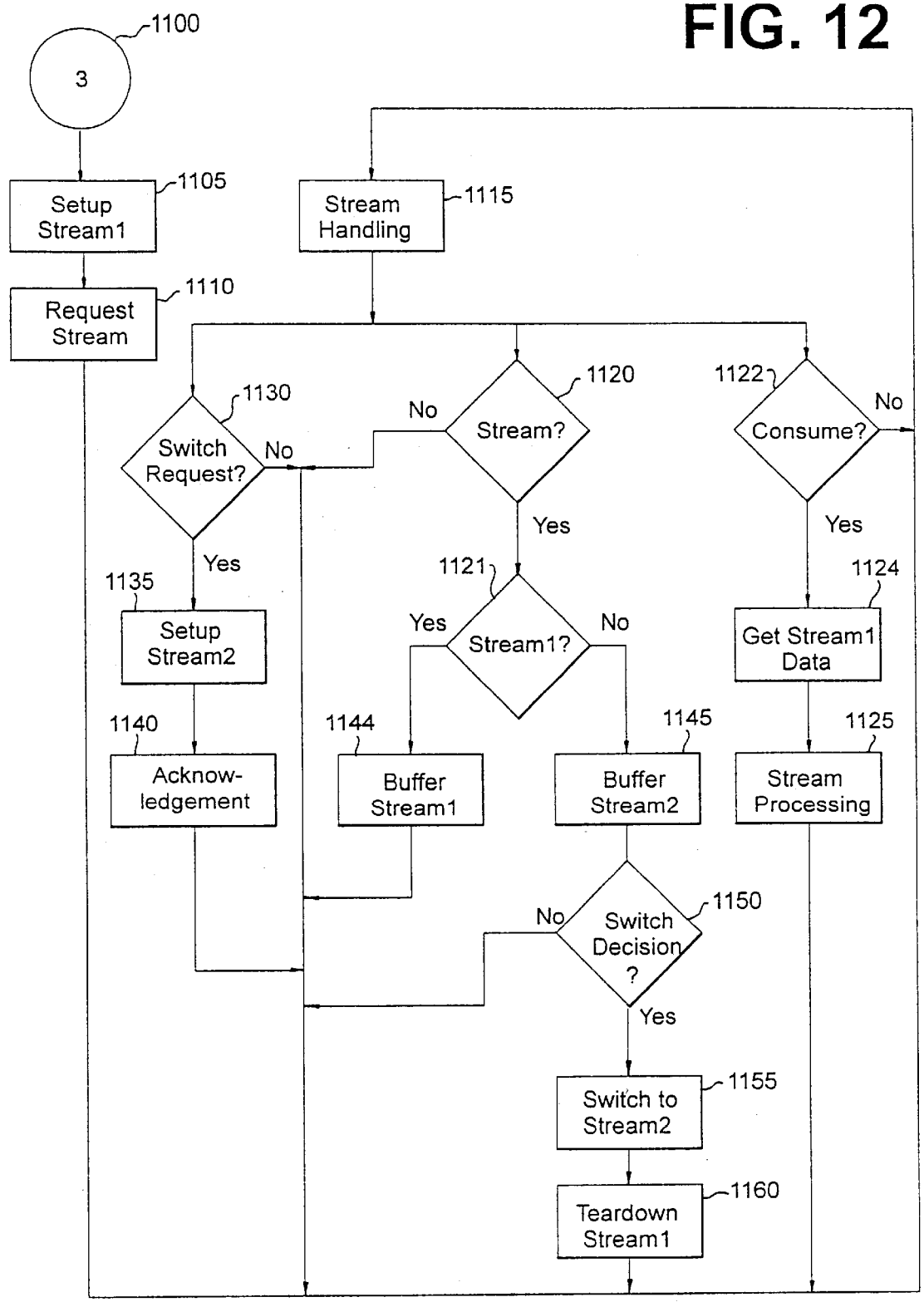
FIG. 12 is a flowchart of a client being migrated between servers (i.e., the client handling of a seamless switch).

FIG. 12 shows the processing steps of the switch-capable client. The client starts at step 1100 by requesting a stream. To do so, it first reserves and sets up resources corresponding to a streaming connection at step 1105. Then at step 1110, it proceeds to place a streaming request, such as a video-on-demand server or as described in this invention a mainframe, to a server. At this point, at step 1115, the client enters the stream handling event loop and waits for streaming events.

There are three events of interest:

a) a switching request at step 1130, b) an incoming stream data event at step 1120, and c) consume data event at step 1122.

Since those events are not perceived by the client, no particular order of events is assumed; for example, if a switching request is received before the start of streaming this may be used to bounce off a client from a server to another server prior to the start of streaming, i.e., static load balancing, where as if a switching event occurs after an incoming streaming data event, this would represent a form of dynamic load balancing.

The need for migrating a streaming client from a primary server PS1 onto another primary server PS2 is particularly desirable so as to enable dynamic reallocation of clients during exceptions due to fault tolerance, e.g., PS1 is scheduled to go down and PS2 is known to be available, and load balancing, e.g., the reallocation of some streams from PS1 to PS2 when needed so as to balance the overall system load. Regardless of the interleaving of events, the goal is to ensure that the consume data event is presented a continuous stream of data.

If at step 1120 it is determined that the event is not an incoming streaming data then the processing returns to step 1115 to wait for streaming events. If incoming streaming data appears, then step 1121 determines at what appropriate streaming connection the data is buffered. If the data is bound for the primary streaming connection it is buffered at step 1144 and then the client processing returns to step 1115 to wait for streaming events. On the other hand, if the data is bound for the secondary streaming connection, it is buffered at step 1145.

At step 1150 it is then determined if sufficient buffering has been built for the secondary streaming connection. It will be understood by those skilled in the art that this is dependent on the particular characteristics of the network connection between the client and the target server. If not enough buffering has been achieved, the client returns to its event handling loop at step 1115 to wait for streaming events. On the other hand, if sufficient buffering has been built for the secondary streaming connection, at step 1155 the client switches onto the secondary streaming connection and re-labels it as its primary while it re-labels the original primary streaming connection as its secondary. After the secondary streaming connection becomes the primary streaming connection, at step 1160 a tear down message is sent to the server associated with the previous primary connection causing the termination of its streaming connection with the client. A reader versed in the arts should appreciate that transient packets on this connection would most likely be discarded. After sending the tear down message, the client returns to its event handling loop at step 1115 to wait for streaming events.

If at step 1122 a consume data event does not appear, the client returns to its event handling loop at step 1115 to wait for streaming events. If a consume data event does appear then the client retrieves the next data packet from its primary streaming connection at step 1124 and apply media processing over the data at step 1125. This may involve assembling a byte stream and presenting the data to the application. Once the data is processed, the client returns to its event handling loop at step 1115 to wait for streaming events.

If at step 1130 the event is determined not to be a switching request the client returns to its event handling loop at step 1115 to wait for streaming events. If the event is determined to be a switching request, then the client starts to setup a secondary streaming connection at step 1135. Once this setup is completed, at step 1140 the client proceeds to send an acknowledgment message to the main server that originated and warned the client about this hand-off request. Once the message is sent, the client returns to its event handling loop at step 1115 to wait for streaming events.

Because events may be generated by any server in the environment as is shown in FIG. 1, it is necessary that events be tagged in such a way so as to uniquely identify their originating server. Similarly the target of the event, i.e., client, must be uniquely identified across the networking environment. The stream must be uniquely identified across the networking environment. In the preferred embodiment, the above requirements are met through the use of a network directory service that allows clients and servers to map unique identifiers into the corresponding servers and streams.

Figure 13:
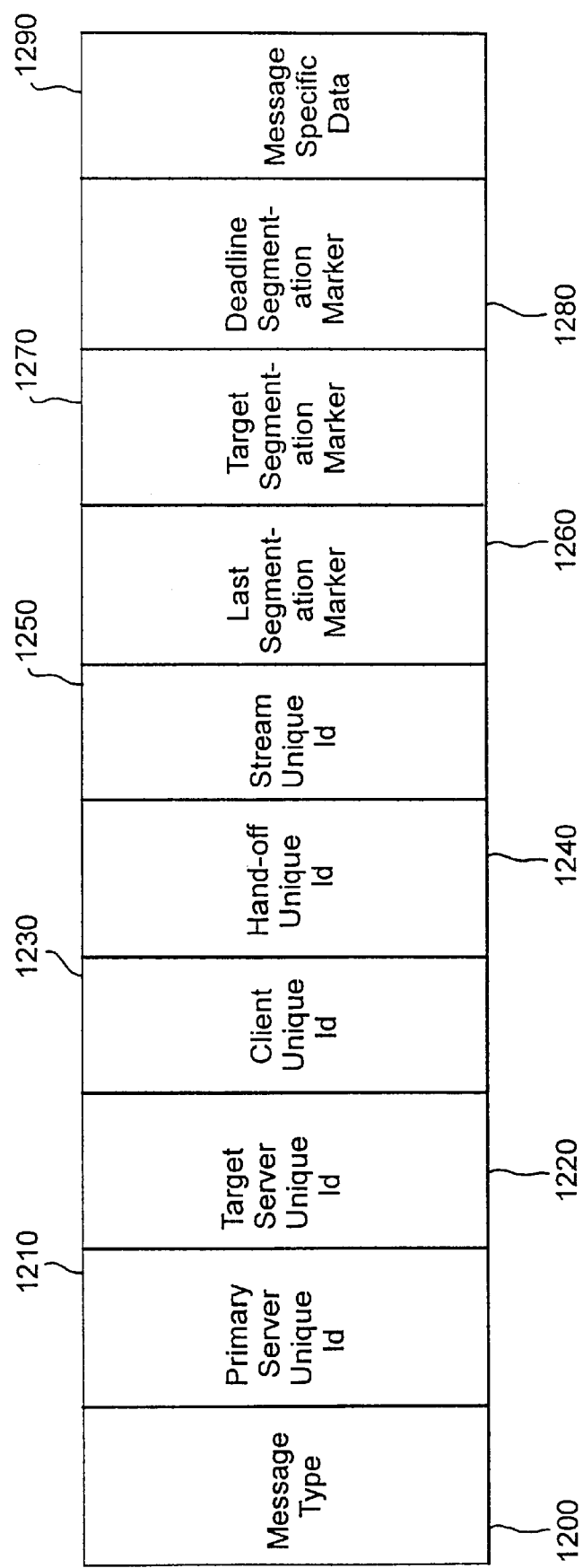
FIG. 13 is a diagram of the data structure associated with hand-off protocol messages as needed by the present invention.

FIG. 13 shows the data structure of hand-off signaling messages as used in the preferred embodiment. A message type field 1200 is used to identify the type of message, for example, hand-off request or hand-off accept. The message type field 1200 is set by the sender. Unique identifiers are used to identify the switching parties: the primary server field 1210, the target server field 1220, and the client field 1230.

Unique identifiers field 1250 are also used to uniquely identify a streaming session across the system. A hand-off identifier field 1240 is used to facilitate simultaneous processing of multiple hand-offs. In the preferred embodiment, to facilitate the negotiation of a common start point in an arbitrary stream, three fields are used: the last seen segmentation marker field 1260, the target segmentation marker field 1270 and the deadline segmentation marker field 1280. Message specific data field 1290 such as a admission constraint, access rights over the hand-off information, billing information, etc. may be appended to these reserved message fields. These fields may be specified to span various offloading scenarios. In particular, it should be noted that the duration of the offload onto the auxiliary server may be determined apriori by one or more of the switching parties based on the satisfaction of a constraint known to one or more of the switching parties, or dynamically and continuously negotiated between the switching parties.

It will be understood by those skilled in the art that the migration may be repeated until a server satisfying a constraint is found, where the constraint may either be: specified by the original server or augmented over the migration traversal. In the preferred embodiment, It should be obvious that how a main server reaches the decision to hand-off a streaming session is purely an implementation issue. There are several approaches, including but not limited to:

migrating a streaming session in response to the expiration of a timer, migrating a streaming session in response to increase streaming load, and migrating in response to a dynamic restructure of the cost/price/performance ratios of subscribers.

It will be understood by those skilled in the art that the binding to a target server opens several possibilities. A reader versed in the arts may also appreciate that the target server may be another primary server, allowing the main server to temporarily offload a streaming client to an auxiliary server through a) a seamless switch from a main server to an auxiliary server followed by b) a seamless switch from the auxiliary server to the other primary server. It should be obvious to a reader versed in the arts that the need for migrating a streaming client from a primary server PS1 onto another primary server PS2 is particularly desirable so as to enable dynamic reallocation of clients during exceptions due to fault tolerance, e.g., PS1 is scheduled to go down and PS2 is known to be available, and load balancing, e.g., the reallocation of some streams from PS1 to PS2 when needed so as to balance the overall system load.

Through the use of one or more auxiliary servers, the present invention allows such migration to be seamless to a client. Alternatively, a reader versed in the arts may appreciate that the main server may as well be the target server, allowing such main server to temporarily offload a client, currently engaged in a streaming session with the main server, onto an auxiliary server so as to create a window of increased resource availability at the main server during part of such period. A reader may also appreciate that the target server may be unknown to the main server, allowing the main server to offload, possibly permanently, a streaming client to some other server comprised of the steps of: a) a seamless switch from a main server to an auxiliary server, and b) one or more migrations from the auxiliary server to the some target server. In the preferred embodiment, AS1 may not necessarily know apriori the target server. It may rely on a directory service 720 (FIG. 9) and place an inquiry 756 (FIG. 9) there for a target server. It will be understood by those skilled in the art that the migration may be performed as well for groups of clients with obvious extensions to the hand-off signaling protocol.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

Having thus described our invention, what we claim as new, and desire to secure by letters patent is:

1. A method for dynamically switching a source of streaming of data stored in distributed servers from a primary server to a target server in a network comprised of one or more primary servers, one or more target servers and one or more clients, said method comprising the following steps:
    a. enhancing said data by dynamically inserting markers into a stream of said data, said markers identifying locations in said stream of data, and including segmentation information which are exchanged among all said primary servers and all said target servers during streaming of said data;
    b. streaming said data from said primary server to a client;
    c. waiting for and retrieving a marker in said stream of data, the segmentation information of said marker identifying a location in said stream of data where said target server is to commence streaming of said data to said client;
    d. initiating and communicating a migration request message by said primary server to said target server and receiving a migration acceptance message from said target server;
    e. initiating and communicating a migration warning message by said primary server to said client and receiving a migration warning acceptance message from said client;
    f. instructing said target server to stream said data to said client from said location identified by said marker in response to receipt of said migration warning acceptance message from said client; and
    g. stopping said streaming of data from said primary server to said client at reception of a migration teardown notification message from said client, wherein a seamless migration of said client between said primary server and said target server is performed to thereby increase resource availability at said primary server.

2. The method of claim 1, wherein said source of streaming data is dynamically migrated from said primary server to said target server while temporal progress and continuity is maintained.

3. The method of claim 2, wherein step (b) further comprises steps of:
    communicating a request for streaming of said data from said client to said primary server;
    applying admission control, scheduling said request, and setting up a streaming connection on said primary server; and
    identifying and locating said markers in said stream of data, and removing said markers from said stream of data prior to decoding of said stream of data on said client.

4. The method of claim 1, further comprising accepting said stream of data from said primary server and said target server by a virtual socket, said virtual socket consisting of one or more network connectors, and one or more partially overlapping buffers.

5. The method of claim 4, wherein step (f) further comprises steps of:
    streaming said data from said target server to said client;
    accepting said stream of data from said primary server and said stream of data from said target server by said client; and
    synchronizing said accepted data by said client.

6. The method of claim 5, wherein said data stream is offloaded to said target server for streaming to said client on a temporary basis, an offload duration being determined according to one of: based on satisfaction of an apriori constraint, or said offload duration being dynamically and continuously negotiated between said primary server originally associated with said data stream and said target server prior to or during said off-load duration.

7. The method of claim 6, wherein said target server collects statistics about migrations of said source of streaming data between primary and target servers, suggests migration patterns on migrations between primary and target servers, and enforces migration patterns on migrations between primary and target servers.

8. A computer program device readable by a machine, tangibly embodying a program of instructions executable by a machine to perform method steps for dynamically switching a source of streaming of data stored in distributed servers from a primary server to a target server in a network comprised of one or more primary servers, one or more target servers and one or more clients, said method comprising the following steps:
    a. enhancing said data by dynamically inserting markers into a stream of said data, said markers identifying locations in said stream of data, and including segmentation information which are exchanged among all said primary servers and all said target servers during streaming of said data;
    b. streaming said data from said primary server to a client;
    c. waiting for and retrieving a marker in said stream of data, the segmentation information of said marker identifying a location in said stream of data where said target server is to commence streaming of said data to said client;
    d. initiating and communicating a migration request message by said primary server to said target server and receiving a migration acceptance message from said target server;
    e. initiating and communicating a migration warning message by said primary server to said client and receiving a migration warning acceptance message from said client;

f. instructing said target server to stream said data to said client from said location identified by said marker; and g. stopping said streaming of data from said primary server to said client at reception of a migration tear-down notification message from said client, wherein a seamless migration of said client between said primary server and said target server is performed to thereby increase resource availability at said primary server.

9. The method of claim 8, wherein said source of streaming data is dynamically migrated from said primary server to said target server while temporal progress and continuity is maintained.

10. The method of claim 9, wherein step (b) further comprises steps of:

communicating a request for streaming of said data from said client to said primary server;

applying admission control, scheduling said request, and setting up a streaming connection on said primary server; and identifying and locating said markers in said stream of data, and removing said markers from said stream of data prior to decoding of said stream of data on said client.

11. The method of claim 8, further comprising accepting said stream of data from said primary server and said target server by a virtual socket, said virtual socket consisting of one or more network connectors, and one or more partially overlapping buffers.

12. The method of claim 11, wherein step (f) further comprises steps of:

streaming said data from said target server to said client;

accepting said stream of data from said primary server and said stream of data from said target server by said client; and synchronizing said accepted data by said client.

13. The method of claim 12, wherein said data stream is offloaded to said target server for streaming to said client on a temporary basis, an offload duration being determined according to one of: based on satisfaction of an apriori constraint, or said offload duration being dynamically and continuously negotiated between said primary server originally associated with said data stream and said target server prior to or during said off-load duration.

14. The method of claim 13, wherein said target server collects statistics about migrations of said source of streaming data between servers, suggests migration patterns on migrations between primary and target primary and target servers, and enforces migration patterns on migrations between primary and target servers.

15. A system for dynamically switching a source of streaming of data stored in distributed serves from a primary server to a target server in a network comprised of one or more primary servers, one or more target servers and one or more clients, said system comprising:

a. a means for enhancing said data by dynamically inserting markers into a stream of said data, said markers identifying locations in said stream of data, and including segmentation information which are exchanged among all said primary servers and all said target servers during streaming of said data;

b. a means for streaming said data from a server to a client;

c. waiting for and retrieving a marker in said stream of data, the segmentation information of said marker identifying a location in said stream of data where said target server is to commence streaming of said data to said client;

d. initiating and a means for communicating a migration request message by said primary server to said target server and receiving a migration acceptance message from said target server;

e. initiating and a means for communicating a hand-off warning message by said primary server to said client and receiving a migration warning acceptance message from said client;

f. a means for instructing said target server to stream said data to said client from said location identified by said marker; and g. a means for stopping said streaming of data from said primary server to said client at reception of a migration tear-down notification message from said client, wherein a seamless migration of said client between said primary server and said target server is performed to thereby increase resource availability at said primary server.

16. The system of claim 15, wherein said source of streaming data is dynamically migrated from said primary server to said target server while temporal progress and continuity is maintained.

17. The system of claim 16, wherein the means of (b) further comprises:

a means for communicating a request for streaming of said data from said client to said primary server;

a means for applying admission control, scheduling said request, and setting up a streaming connection on said primary server; and a means for identifying and locating said markers in said stream of data, and removing said markers from said stream of data prior to decoding of said stream of data on said client.

18. The system of claim 15, further comprising accepting said stream of data from said primary server and said target server by a virtual socket, said virtual socket consisting of one or more network connectors, and one or more partially overlapping buffers.

19. The system of claim 18, wherein (f) further comprises:

a means for streaming said data from said target server to said client;

a means for accepting said stream of data from said primary server and said stream of data from said target server by said client; and a means for synchronizing said accepted data by said client.

20. The system of claim 19, wherein said data stream is offloaded to said target server for streaming to said client on a temporary basis, an offload duration being determined according to one of: based on satisfaction of an apriori constraint, or said offload duration being dynamically and continuously negotiated between said primary server originally associated with said data stream and said target server prior to or during said off-load duration.

21. The system of claim 20, wherein said target server collects statistics about migrations of said source of streaming data between primary and target servers, suggests migration patterns on migrations between primary and target servers, and enforces migration patterns on migrations between servers.

* * * * *

UNITED STATES PATENT AND TRADEMARK OFFICE
CERTIFICATE OF CORRECTION

PATENT NO. : 6,377,996 B1
DATED : April 23, 2002
INVENTOR(S) : Leon L. Lumelsky et al.

It is certified that error appears in the above-identified patent and that said Letters Patent is hereby corrected as shown below:

Column 17,
Line 46, delete second occurrence of "primary and target"

Signed and Sealed this

Thirty-first Day of December, 2002

JAMES E. ROGAN
*Director of the United States Patent and Trademark Office*